US011125285B2

(12) United States Patent
Andersson

(10) Patent No.: US 11,125,285 B2
(45) Date of Patent: Sep. 21, 2021

(54) LEVER TYPE BRAKING DEVICE

(71) Applicant: DELLNER BRAKES AB, Borlänge (SE)

(72) Inventor: Mats Andersson, Rättvik (SE)

(73) Assignee: Dellner Brakes AB, Borlänge (SE)

( * ) Notice: Subject to any disclaimer, the term of this patent is extended or adjusted under 35 U.S.C. 154(b) by 241 days.

(21) Appl. No.: 16/327,451

(22) PCT Filed: Jun. 9, 2017

(86) PCT No.: PCT/EP2017/064173
§ 371 (c)(1),
(2) Date: Feb. 22, 2019

(87) PCT Pub. No.: WO2018/036676
PCT Pub. Date: Mar. 1, 2018

(65) Prior Publication Data
US 2019/0178315 A1    Jun. 13, 2019

(30) Foreign Application Priority Data

Aug. 25, 2016 (EP) .................................... 16185653

(51) Int. Cl.
*F16D 55/224* (2006.01)
*B61H 5/00* (2006.01)
*F16D 65/18* (2006.01)
*F16D 63/00* (2006.01)
*F16D 65/52* (2006.01)
*F16H 1/06* (2006.01)
(Continued)

(52) U.S. Cl.
CPC .......... *F16D 55/2245* (2013.01); *B61H 5/00* (2013.01); *F16D 63/00* (2013.01); *F16D 63/006* (2013.01); *F16D 65/183* (2013.01); *F16D 65/52* (2013.01); *F16H 1/06* (2013.01); *F16H 25/2003* (2013.01); *F05B 2260/902* (2013.01); *F16D 2121/24* (2013.01); *F16D 2125/40* (2013.01); *F16D 2125/64* (2013.01)

(58) Field of Classification Search
CPC .... F16D 55/2245; F16D 65/52; F16D 65/183; F16D 63/006; F16H 25/2003; F16H 1/06; B61H 5/00
USPC ....................................................... 188/72.9
See application file for complete search history.

(56) References Cited

U.S. PATENT DOCUMENTS

| 3,768,598 A | * | 10/1973 | Pollinger | ................ F16D 66/02 |
| | | | | 188/1.11 R |
| 4,592,451 A | * | 6/1986 | Persson | .................. B61H 15/00 |
| | | | | 188/71.9 |

(Continued)

FOREIGN PATENT DOCUMENTS

| CN | 1609738 A | 4/2005 |
| CN | 1862049 A | 11/2006 |

(Continued)

*Primary Examiner* — Vishal R Sahni
(74) *Attorney, Agent, or Firm* — Dilworth & Barrese, LLP

(57) ABSTRACT

A braking device of lever type, wherein actuation means is realized in the form of a screw jack (19) comprising an electric motor (20) and an angle gear (21) driving a jack screw (22) which is coupled between the levers (2; 5). A load sensor (29) coupled to one lever controls, via a power regulating means (25), the force applied in braking mode. A position sensor (31) coupled to the other lever determines the lever's positions in idling mode.

20 Claims, 2 Drawing Sheets

Figure 3:
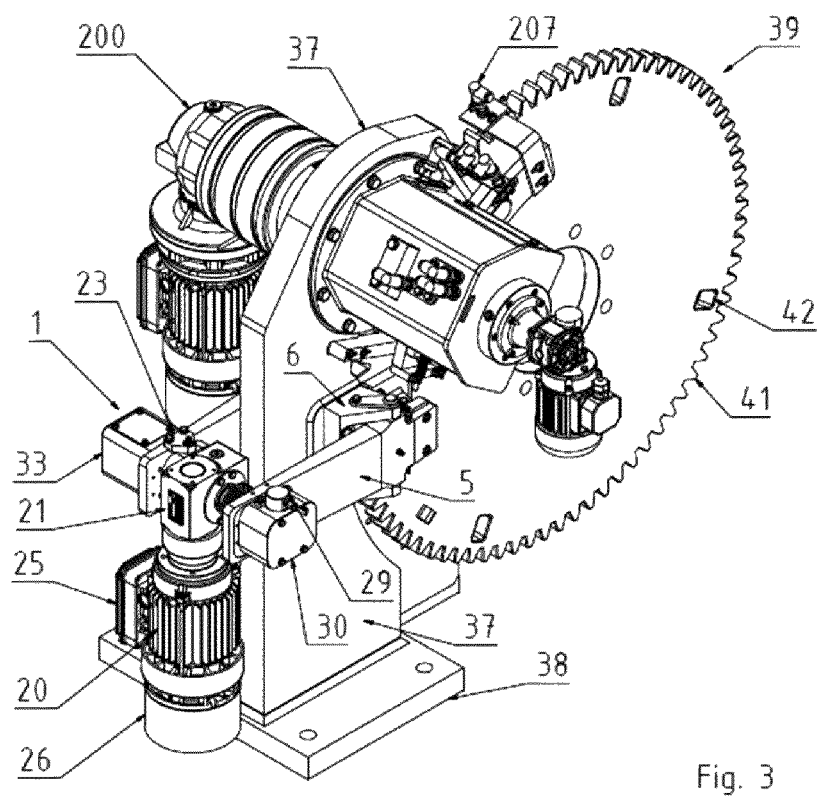

(51) Int. Cl.
*F16H 25/20* (2006.01)
*F16D 121/24* (2012.01)
*F16D 125/40* (2012.01)
*F16D 125/64* (2012.01)

(56) References Cited

U.S. PATENT DOCUMENTS

| | | | | |
|---|---|---|---|---|
| 4,706,786 | A * | 11/1987 | Nadas | B61H 15/00 188/196 BA |
| 5,038,896 | A * | 8/1991 | Wirth | B60T 17/16 188/153 R |
| 5,103,940 | A * | 4/1992 | Meneut | B66D 5/26 188/72.6 |
| 5,255,760 | A * | 10/1993 | Lamb | B66B 5/0006 188/1.11 L |
| 6,722,477 | B1 * | 4/2004 | Wolfsteiner | B61H 5/00 188/173 |
| 6,796,548 | B2 * | 9/2004 | Nagata | B66D 5/08 187/254 |
| 6,957,571 | B2 * | 10/2005 | Staltmeir | F16D 55/2245 73/121 |
| 7,413,061 | B2 * | 8/2008 | Wagner | B61H 15/0028 188/1.11 E |
| 8,763,766 | B2 * | 7/2014 | Ebner | F16D 65/567 188/72.9 |
| 8,794,393 | B2 * | 8/2014 | Argirovski | F16D 65/56 188/71.8 |
| 9,932,051 | B2 * | 4/2018 | Suzuki | F16D 55/2255 |
| 10,260,587 | B2 * | 4/2019 | Kawai | H01R 13/2442 |
| 2004/0074709 | A1 * | 4/2004 | Krug | F16D 55/2245 188/72.1 |
| 2006/0005653 | A1 * | 1/2006 | Fleytman | F16H 1/06 74/425 |
| 2006/0151261 | A1 * | 7/2006 | Wagner | F16D 55/2245 188/72.9 |
| 2008/0000731 | A1 | 1/2008 | Dewberry et al. | |
| 2010/0096224 | A1 * | 4/2010 | Kim | F16D 51/48 188/74 |
| 2011/0169268 | A1 | 7/2011 | Wei et al. | |
| 2014/0231188 | A1 * | 8/2014 | Prouzet | F16D 55/22 188/72.3 |

FOREIGN PATENT DOCUMENTS

| | | |
|---|---|---|
| CN | 101387324 A | 3/2009 |
| CN | 101449078 A | 6/2009 |
| CN | 101523074 A | 9/2009 |
| CN | 102015393 A | 4/2011 |
| CN | 104955692 A | 9/2015 |
| CN | 105307913 A | 2/2016 |
| EP | 0 188 710 A1 | 7/1986 |
| EP | 1640233 A1 | 3/2006 |
| EP | 2 500 597 A1 | 9/2012 |
| EP | 2837533 A1 | 2/2015 |
| JP | 2000-161404 A | 6/2000 |
| KR | 10-0801415 B1 | 2/2008 |
| WO | 2010/015933 A1 | 2/2010 |

* cited by examiner

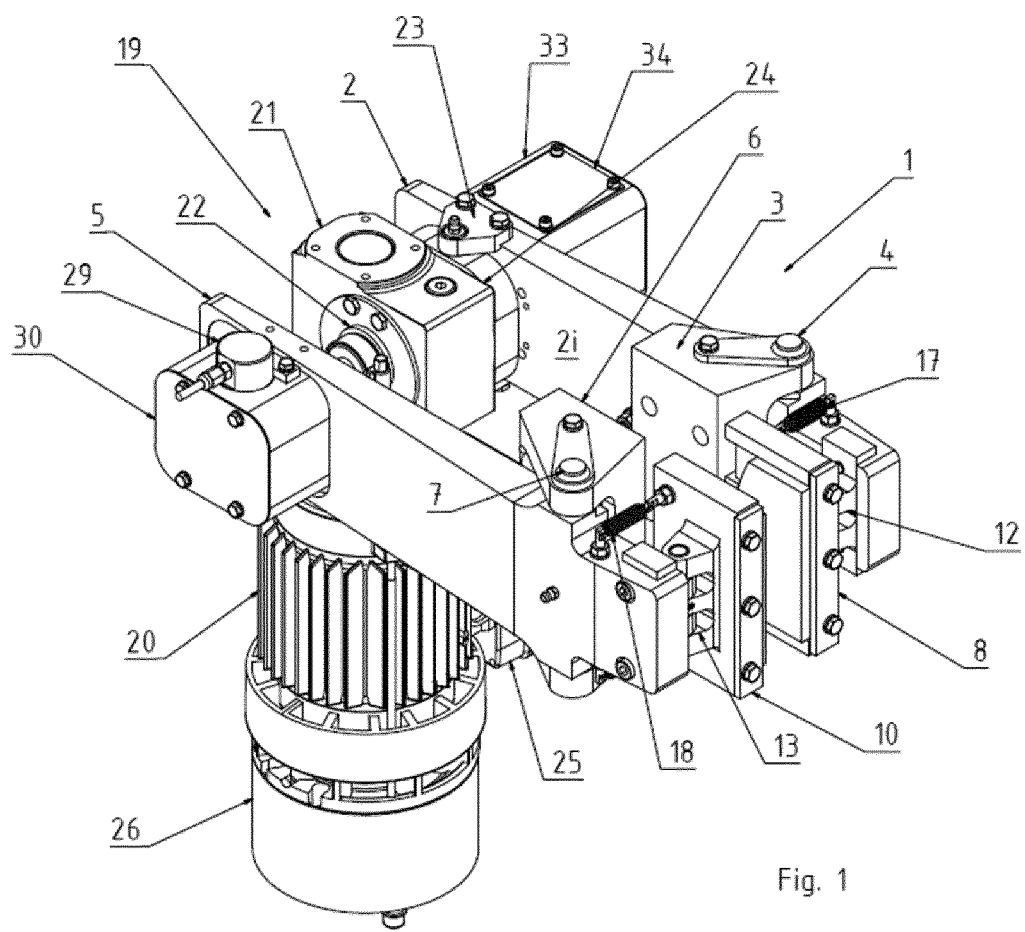
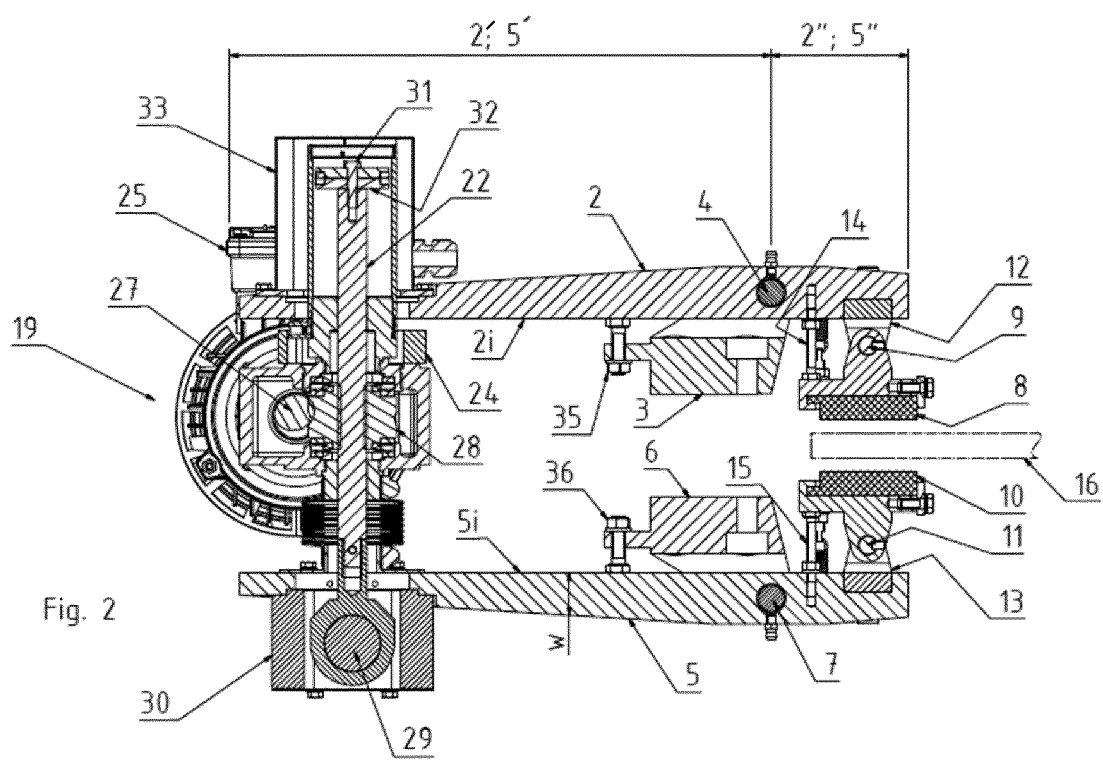
Fig. 1
Fig. 2

LEVER TYPE BRAKING DEVICE

TECHNICAL FIELD OF THE INVENTION

The present invention relates to a braking device suitable for slowing down or stopping the rotation of a rotary shaft, or for stopping or slowing down the travel of a device or vehicle along a rail. The braking device of the present invention is intended for use in connection with a rotary shaft that carries a radial disc or flange in rotation between brake pads in the braking device, or in connection with a device or vehicle that moves along a rail which runs longitudinally between the brake pads in non-braking mode.

In particular, the present invention relates to a lever type braking device comprising a left lever journaled for swinging motion about a first axis, a right lever journaled for swinging motion about a second axis in parallel with the first axis, the axes dividing each lever in a shorter lever length and a longer lever length. Left and right brake pads respectively are pivotally journaled in the shorter lever lengths of the left and right levers. An actuation means is arranged engaging the longer lengths of the levers and operable for swinging the levers in contra-rotating directions about their respective axes, the actuation means controlling the movements of the brake pads between braking and idle positions as well as generating a clamping force applied by the brake pads in braking.

A second aspect of the present invention concerns a braking device in integrated assembly with, on one hand, structural and functional means for positively locking a rotary shaft against rotation in a set pivotal position, and on the other hand a shaft turning mechanism arranged to adjust the pivotal position of a rotary shaft at standstill.

BACKGROUND AND PRIOR ART

The braking device of the present invention can be referred to a category of lever brakes adapted for stopping and/or holding applications. Designed for braking forces ranging from a few thousand Newton (N) to several hundred kN they find a widespread use in, e.g., sea vessels and wind power plants for stopping the rotation of propellers or turbines.

Although the braking force is in most traditional applications generated by hydraulic pressure, other applications may require alternative power in order to avoid the consequences of a leaking hydraulic fluid circuit.

In the past, attempts have been made to replace the hydraulic power by electrical power in disc brake designs. EP 2 500 597 A1, e.g., discloses a disc brake arrangement for a wind power plant wherein an electrical motor activates the brake via a worm gear transmission including a planetary roller screw that drives a spindle in axial translation towards the brake pad.

One problem that needs to be addressed in the application of electrical power in disc brakes for rotary shafts is vibration in the rotor which can be transferred to a motor via the brake pads and the components of the power transmission. In addition to causing wear in rotational parts and bearings of the motor, these vibrations may lead to a shift in position of gears and a resulting loss of braking force. In critical environments personal safety may be jeopardized if vibrations are allowed to cause involuntary application of the brake.

In an application for an aircraft rotor or propeller, US 2014/0231188 A1 disclose a rotary-shaft brake system including a lever type brake comprising an elastically bending lever. In braking mode as well as in idle position the bending lever is forced into a deformed condition by a linear actuator engaging the levers. In order to avoid vibration or involuntarily applied braking, the bending lever is thus constantly set under stress by the actuator, which is electrically powered.

Although elastic in nature, a metal or steel element which is constantly set under a deforming load will ultimately suffer from fatigue and change in the crystal structure of the material, resulting in a decrease of bending resistance. In a lever brake application, a gradual decrease in bending resistance may potentially affect the clamping force applied in braking mode. In US 2014/0231188 A1 the clamping force is controlled by measuring the bow of the bendingly deformable lever in braking. However, over time, the degree of bending may not represent the true value of the clamping force and the braking effect generated by bendingly deformable brake levers.

SUMMARY OF THE INVENTION

It is an object of the present invention to provide an alternative lever type braking device operated on electrical power.

It is a special object of the present invention to provide an electrically powered lever type braking device with a clamping force control which is not hampered by a change in characteristics over time in a force-multiplying brake lever made of metal such as steel.

It is another object of the present invention to provide a braking device in an all-electrically powered integrated assembly, with structural and functional means for stopping, holding and/or turning a rotary shaft as may be desired during installation or maintenance, e.g.

The first object at least is met in a braking device of lever type substantially as initially described, wherein the actuation means is realized in the form of a screw jack comprising an electric motor and an angle gear driving a jack screw which is coupled between the levers. A load sensor coupled to one lever controls, via a power regulating means, the force applied in braking mode. A position sensor coupled to the other lever determines the lever positions in idling mode.

An essential feature of the invention is the use of force-multiplying levers that not only reduce the need for power effect in result of leverage but also, due to the ratio of lever lengths and resulting stroke length of the jack, provide more accurate control and regulation of the force applied via a rotating motor shaft. The relation in lengths between the longer lever length on one side of the fulcrum and the shorter lever length on the other side may be determined to provide a lever ratio in the range of 2:1-6:1, preferably in the range of 3:1-5:1, and most preferred a ratio of approximately 4:1.

Another advantage is achieved by the choice of a screw jack including an angle gear drive as proposed. In contrast to a linear drive, which must be installed essentially in the direction of force applied by the actuator, and typically on the left or right side of the lever arrangement, the angular gear drive may be integrated into the lever system and offers great liberty for orientation of the motor at any suitable pivotal orientation about the line of force that follows the length of the jack screw.

Persons skilled in the art will realize that the present solution can be sized for many different applications, and will also understand what parameters, such as motor strength, screw jack gear ratio, lever ratio, brake pad area and brake pad friction coefficient etc., to use in calculation of a specific design. Thus, for the purpose of disclosure of the invention it is neither necessary nor useful to specify in detail the applicable value ranges for every parameter of interest. However, since the angle gear drive is one essential feature of the invention, an angle gear ratio in the range of 5:1-50:1 is disclosed as a preferred design parameter.

Still another advantage achieved by the invention as disclosed and claimed is high accuracy and consistency in measurements, provided by a sensor that records the force applied from the actuator rather than the resulting effect on the lever.

Notwithstanding any change in characteristic in the lever material, whether it be due to fatigue, temperature or other cause, the brake always provides the clamping force registered by the load sensor multiplied with the lever ratio.

Yet another advantage provided is that the air gap between brake pads and an inter-positioned brake disc or flange can be readily set in idling mode by a simple adjustment of the position sensor. A widening air gap resulting from wear of the friction elements in the brake pads can be readily compensated for by the same means.

The lever arrangement is journaled in the brackets in a free floating manner, in this context meaning that the levers automatically adjust their positions for an evenly applied clamping force on each side of the brake disc or flange in braking mode. In order to ensure that both sides brake pads come free from the disc when the brake is released, pivot limiting means are provided on the brackets as counter supports to prevent the single pivoting of one lever only upon return to the idle position.

These pivot limiting means on the brackets are adjustable and adjusted to provide the levers some freedom of movement also in the idle position. This way, the levers are completely released from stress in the idle position.

An elastic member, such as a tensioning spring, may be connected between a lever and its associated bracket. The elastic member, if appropriate, is effective for preventing spontaneous swinging of the levers in the idle position, thus also counteracting vibrations and noise in the lever arrangement.

The brake pads are pivotally supported in mutually opposing inwardly facing sides of the left and right levers. A tensioning spring and a pivot limiter respectively ensures that the brake pads are maintained in parallel relation in the idle position.

The pivot limiter is preferably adjustable to permit control of parallelism between brake pads and brake disc/flange.

The angle gear in the screw jack comprises a worm screw on the motor shaft and a gear wheel on the jack screw. Engaging threads may be designed to provide self-locking engagement to maintain the clamping force in braking mode. Return of the brake pads from braking position to idle position is achievable by reversing the rotational direction of the electric motor.

In a case where self-locking engagement in the angle gears is not used, a motor with an electro-mechanical or electro-magnetic brake acting on the motor shaft may instead be used for maintaining the clamping force applied in braking mode.

With respect to the structural design of the brake's components it should be mentioned that the cross-sectional area, especially the thickness dimension, of the lever, may be arranged with a gradual and continuous reduction that forms a taper in the longer length of the lever. In combination with smooth faces to avoid any kind of indication that might lead to breakage, the taper in the lever achieves an even and beneficial distribution of stress when the brake is applied.

The brake as heretofore described is a stand-alone device which can be applied per se in many situations.

One especially advantageous implementation of the braking device is in assembly with a positive lock- and release mechanism arranged and operable for arresting a rotary shaft by engagement with a brake disc or flange affixed to the rotary shaft, this way positively locking the rotary shaft against rotation in the set pivotal position.

Another especially advantageous implementation of the braking device is in assembly with a shaft turning mechanism arranged to adjust the pivotal position of a rotary shaft at standstill.

In either case the assembly preferably includes an elongate, plate-like stand having a supporting base at its bottom end.

The stand is adapted for mounting the left and right brackets on left and right sides respectively of the stand. It will be understood that in this case the short and long portions of the levers are both of sufficient lengths to position the brake pads and the screw jack, respectively, outside the opposite front and rear rims of the essentially flat stand.

In a fully integrated solution all three functionalities, i.e. the braking device, the lock- and release mechanism and the shaft turning mechanism, may all be arranged and supported on the stand. In such case, the preferred order in position on the stand places the lock- and release mechanism at the lowermost end of the stand close to the base support, since this part of the assembly is expected to transfer the greatest load to the stand. For the same reason the shaft turning mechanism is preferably placed in the uppermost end of the stand, leaving a central region of the stand for mounting of the braking device.

The lock-and release mechanism comprises an extendable/retractable plunger cooperating with a brake disc or flange affixed to a rotary shaft, the brake disc or flange comprising a number of through holes located on a circle radially inside of the periphery of the brake disc or flange. The plunger may be electrically actuated in extension and retraction by means of an electric motor and a linear drive.

The shaft turning mechanism comprises a gear wheel arranged rotatable with its toothed periphery engageable with a toothed periphery of a brake disc or flange affixed to a rotary shaft. The gear wheel may be electrically rotatable by means of an electric motor and a bevel gear drive.

SHORT DESCRIPTION OF THE DRAWINGS

Figure 4:
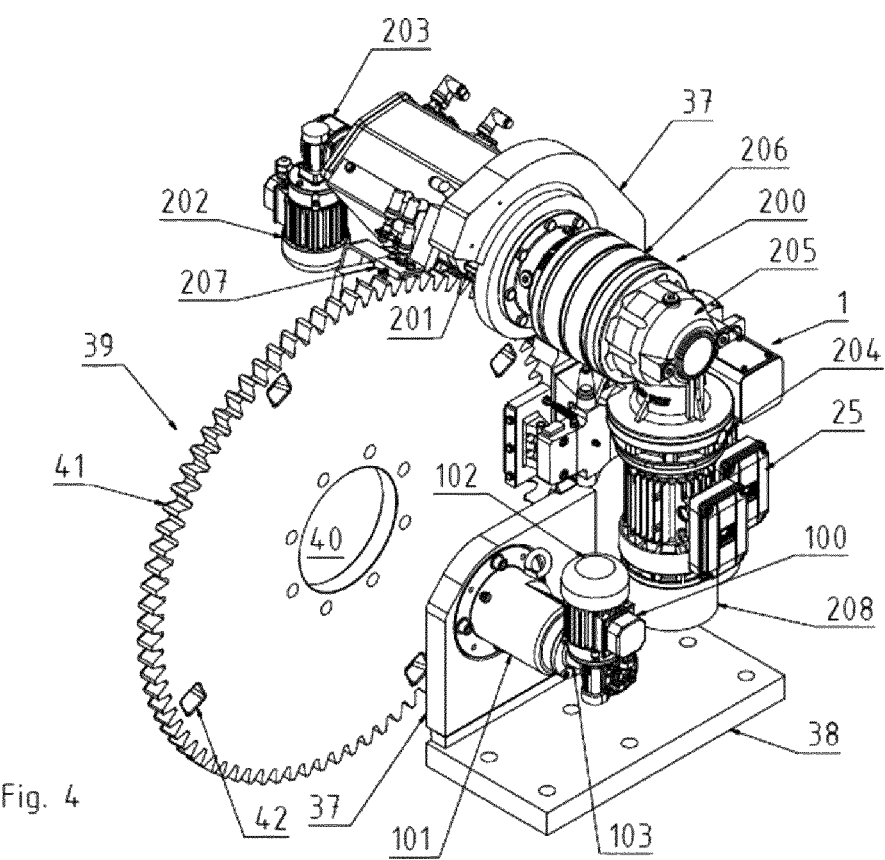

Embodiments and details of the invention will now be described with reference made to the accompanying drawings. In the drawings, FIG. 1 is a 3-dimensional view of the braking device, FIG. 2 is partially sectioned view from above of the braking device of FIG. 1, taken along the plane II-II in FIG. 1, FIG. 3 is a 3-dimensional view of an integrated assembly comprising the braking device of FIGS. 1 and 2, and FIG. 4 is a corresponding 3-dimensional view of the integrated assembly seen from another viewing angle.

DETAILED DESCRIPTION OF PREFERRED EMBODIMENTS

Firstly, it should be noted that the terms "left" and "right" are used in the present disclosure for the purpose of identification only, and shall not be literally understood to specify an absolute orientation in relation to the viewer.

FIGS. 1 and 2 illustrate the braking device 1 of the present invention. The braking device 1 comprises a left lever 2 that is pivotally journaled in a left bracket 3 for swinging movement about a first axis defined by an axle 4 seated in the left bracket. A right lever 5 is in a corresponding way pivotally journaled in a right bracket 6 for swinging movement about a second axis defined by an axle 7 seated in the right bracket. The brackets 3 and 6 are arranged for mounting to the opposite sides of a supporting structure as will be exemplified below.

The axes 4 and 7 define left and right fulcrums which divide the levers in a longer lever length 2', 5' and a shorter lever length 2" and 5" respectively (see FIG. 2). In the embodiment shown in FIGS. 1 and 2 the longer lever lengths 2' and 5' are formed with a tapering thickness w that is continuously reducing from the respective fulcrum towards the ends of the levers. It is also to be observed that the shape of the levers 2 and 5 are otherwise void of any formation that would interrupt the smooth and continuous surface of the levers.

A left brake pad 8 is pivotally journaled on a pivot 9 in the end of the shorter length of the left lever 2. A right brake pad 10 is in a corresponding way pivotally journaled on a pivot 11 in the end of the shorter length of the right lever 5. In the embodiment shown in FIGS. 1 and 2 the brake pads are journaled in hinges 12 and 13 which are mounted in the mutually opposite, inwards facing side faces 2i and 5i of the levers 2 and 5.

The brake pads 8 and 10 are each associated with a pivot limiter 14 and 15 respectively which determines the pivotal positions of the brake pads in the idle position, i.e. in non-braking mode. In particular, the pivot limiter is arranged adjustable to ensure a substantially parallel relation between the brake pads as well as between the brake pads and a brake disc or flange respectively (see brake disc 16 in FIG. 2), which in use occupies the gap between the brake pads, except for an air gap on either side of the disc in the non-braking mode. In the embodiment shown, the pivot limiter is realized as a threaded bolt 14, 15 cooperating with a tension spring 17 and 18 respectively, the springs being effective for biasing the brake pads towards the pivot limiters.

In the braking device 1, braking power is generated by means of an electrically actuated screw jack 19. The main components of the screw jack 19 are an electrical motor 20, an angle gear drive 21 and a jack screw 22. These components are suspended in the end region of the longer lever length of one of the levers, in this case in the end of the left lever 2. A mounting bracket 23 connects pivotally the screw jack to the lever by engaging the screw jack housing 24 on the inwards facing side 2i of the lever 2.

The motor 20 comprises a power control and regulation means 25 and a motor brake 26. The motor output shaft 27 carries a worm thread engaging a geared nut 28 that is rotationally journaled in the screw jack housing 24. The nut has an inner thread engaging an external thread on the jack screw. When the motor is powered, the rotating nut 28 drives the jack screw in linear translation, in braking pushing the levers apart until the brake pads come into contact with the brake disc or flange. Since the lever assembly including the screw jack 19 is a unit that is swinging freely on the first and second axes 4 and 7, the lever assembly will adjust automatically for alignment with the brake disc/flange.

A load sensor 29 is arranged for controlling the clamping force applied by the screw jack 19 in braking mode. The sensor 29 is a load cell coupled to the right lever 5, and more precisely fixedly accommodated in a sensor seat 30 which is supported in the end region of the longer length 5' of the right lever 5. The sensor 29 takes up the load applied from the jack screw in braking mode and generates an electrical signal, the voltage of which is proportional to the load. The output signal from the load sensor is translated into a metric value which is used together with other metric parameters such as the ratio of levers, gear ratio and motor power for determining the clamping force applied by the brake pads. These calculations can be made in an external control unit which is coupled to the motor's power control to cut or adjust the power supply in response to the execution of a force control sequence that is programmed into the control unit.

The relative position of left and right levers in the idle position is determined through a position sensor 31 which is connected to the motor's power control. The position sensor 31 initiates a cut of the power supplied to the motor as the jack screw 22 reaches a predetermined retraction position in return from its extended position in braking mode. The position sensor 31 detects the position of the extreme end 32 of the jack screw 22 which reaches, through an opening in the lever 2, into a housing 33 that is coupled to the outwards facing side of the lever. A detachable hatch 34 provides access to the position sensor in the housing for setting the triggering position that cuts the power supply to the motor.

Pivot limiting means are installed in the braking device to prevent spontaneous swinging of the lever assembly in the idle position. In the illustrated embodiment bolts 35 and 36 are secured in the brackets 3 and 6 respectively, and arranged adjustable in relation to the inwards facing sides of the levers so as to provide the levers an idling position that ensures the forming of an air gap between the brake pads and the disc brake or flange, on each sides respectively of the disc brake/flange.

The pivot limiting means, or bolts 35, 36, may be adjusted for minimum clearance towards the levers' inward faces. Elastic means such as tensioning springs (not illustrated in the drawings) may be arranged between the brackets and the levers to prevent vibration and noise, if required.

Integration of the braking device 1 in assembly with supplementing functions and means will now be described with reference to FIGS. 3 and 4.

The integrated assembly comprises the braking device 1, a lock-and release mechanism generally denoted by reference number 100, and a shaft turning mechanism correspondingly denoted 200. The braking device 1, the lock-and release mechanism 100 and the shaft turning mechanism 200 are supported in a stand 37 of generally flat and plate-like structure, rising from a base plate 38 that is attached in the lower end of the stand. In use, the base plate can be bolted to a structural part of an application which requires the brake installation.

The integrated assembly is configured for cooperation with a specially designed brake disc 39. The brake disc has a central opening 40 for insertion of a rotary shaft (the shaft is omitted from the drawings) in a rotationally fixed relation between the shaft and the brake disc. In particular, the special design includes a toothed periphery 41, as well as a number of through holes 42 which are arranged on a circle, i.e. at equal radial distance inside the toothed periphery. The holes 42 may be evenly spaced along that circle.

The holes 42 are arranged for cooperation with a plunger of the lock- and release mechanism 100. The plunger, which is invisible in the drawings, is installed in a housing 101 and in the housing journaled to be moved from a position retracted in the housing to an extended position wherein the plunger is inserted in one of the holes 42. Actuation of the plunger in extension and retraction is accomplished by means of an electric motor 102 and a linear drive 103.

The toothed periphery 41 of the brake disc 39 is arranged for cooperation with a gear wheel 201 that is rotationally journaled in the shaft turning mechanism 200. The gear wheel is visible in FIG. 4. The gear wheel 201 is sideways shiftable between an operative position, in toothed engagement with the brake disc, and a rest position out of engagement with the brake disc 39. Shifting the gear wheel in and out of engagement with the brake disc can be accomplished by means of an electric motor 202 and a bevel gear 203. In engaged mode, the gear wheel 201 can be rotated for slowly rotating the brake disc and the shaft affixed thereto. An electric motor 204 is drivingly connected to the gear wheel 201 via a bevel gear drive 205 and a gear box 206. The gear box 206 is configured for substantial reduction of the motor spindle speed in order to generate a slow revolution suitable for finer adjustment of the position of the rotary shaft in installation and maintenance operations. A counter 207 may be arranged to control the revolution of the rotary shaft down to a single tooth length of the toothed periphery of the brake disc. The motor 204 may be equipped with a motor brake 208 which can be applied to the motor spindle in order to arrest the gear wheel and thus also the brake disc and shaft in a set pivotal position.

The braking device of the present invention is advantageously applied in assembly with a sea vessel propulsion shaft.

Another useful implementation of the braking device is in assembly with a power generation shaft.

Still another useful implementation of the braking device is in assembly with a mining machinery.

Yet another useful and advantageous implementation of the braking device is in assembly with a manufacturing process machinery.

Another possible implementation of the braking device is in assembly with a device or vehicle moving along a rail.

It finally serves to be noticed that a user and environmental advantage resides in the essential feature of electric drives for the operative functions in the integrated assembly. It will be realized that the braking device 1 as claimed and described provides the indispensable basis for this achievement.

The invention claimed is:

1. A braking device (1) comprising:
   a left lever (2) journaled in a left bracket (3) for swinging motion about a first axis (4),
   a right lever (5) journaled in a right bracket (6) for swinging motion about a second axis (7) in parallel with the first axis, the axes dividing each lever in a shorter lever length (2"; 5") and a longer lever length (2'; 5'),
   left and right brake pads (8; 10) respectively, pivotally journaled in the shorter lengths of the left and right levers,
   an actuation means (19) engaging the longer lengths of the levers and operable for swinging the levers in contra-rotating directions about their respective axes (4; 7), the actuation means controlling the movements of the brake pads between braking and idle positions as well as generating a clamping force applied by the brake pads in braking,
   wherein the actuation means are a screw jack (19) comprising an electric motor (20) and an angle gear (21) driving a jack screw (22) which is coupled between the levers (2; 5), and
   a load sensor (29) directly situated on or attached coupled to the right one lever (5) controls, via a power regulating means (25), the force applied in braking mode, and a position sensor (31) directly situated on or attached to the left lever (2) determines the left lever's positions in idling mode.

2. The braking device of claim 1, wherein adjustable pivot limiting (35; 36) means on the brackets (3; 6) are adjusted to provide the levers (2; 5) freedom of movement in the idle position.

3. The braking device of claim 2, wherein an elastic member is connected between a lever (2; 5) and its associated bracket (3; 6) and effective for preventing spontaneous swinging of the levers in the idle position.

4. The braking device of claim 1, wherein the brake pads (8; 10) are pivotally supported in mutually opposing side faces (2i; 5i) of the left (2) and right (5) levers, and in the idle position maintained in parallel relation by a tensioning spring (17; 18) and an adjustable pivot limiter (14; 15) respectively.

5. The braking device of claim 1, wherein the angle gear (21) comprises a worm screw (27) and a geared nut (28) wherein threads are designed to provide self-locking engagement such that return of the brake pads from braking position to idle position is achievable only by reversing the rotational direction of the electric motor (20).

6. The braking device of claim 5, wherein the angle gear (21) has a gear ratio in the range of 5:1-50:1.

7. The braking device of claim 1, wherein the relation in lengths between the longer lever length (2'; 5') and the shorter lever length (2"; 5") provides a lever ratio in the range of 2:1-6:1.

8. The braking device of claim 1, wherein a cross-sectional area is gradually and continuously reducing towards the end of the longer lever length of at least one of the left and right levers.

9. The braking device of claim 1, wherein the left and right brackets (3; 6) are supported on left and right sides respectively of a stand (37), further comprising a positive lock- and release mechanism (100) arranged on the stand and operable for arresting a rotary shaft by engagement with a brake disc or flange (39) affixed to the rotary shaft.

10. The braking device of claim 9, wherein the lock-and release mechanism (100) comprises an extendable/retractable plunger which is electrically actuated in extension and retraction by means of an electric motor (102) and a linear drive (103).

11. The braking device of claim 1, wherein the left and right brackets (3; 6) are supported on left and right sides respectively of a stand (37), and
   further comprising a shaft turning mechanism (200) arranged on the stand and operable for turning a rotary shaft by engagement with a brake disc or flange (39) affixed to the rotary shaft.

12. The braking device of claim 11, wherein the shaft turning mechanism (200) comprises a gear wheel (201) arranged rotatable with its toothed periphery engageable with a toothed periphery (41) of the brake disc or flange (39) affixed to the rotary shaft.

13. The braking device of claim 12, wherein the gear wheel (201) is electrically rotatable by an electric motor (204) and a bevel gear drive (205).

14. The braking device of claim 1, further comprising a rotary shaft having a brake disc or flange (39) affixed thereto, wherein the brake disc or flange comprises a toothed periphery (41).

15. The braking device of claim 1, further comprising a rotary shaft having a brake disc or flange (39) affixed thereto, wherein the brake disc or flange comprises a number of through holes (42) that are located on a circle radially inside of the periphery of the brake disc or flange.

16. The braking device of claim 2, wherein the elastic member is a tensioning spring.

17. The braking device of claim 7, wherein the lever ratio is in the range of 3:1-5:1.

18. The braking device of claim 8, wherein a thickness dimension (w) of at least one of the left and right levers, is gradually and continuously reducing towards the end of the longer lever length of the respective lever.

19. A braking device (1) comprising:
a left lever (2) journaled in a left bracket (3) for swinging motion about a first axis (4),
a right lever (5) journaled in a right bracket (6) for swinging motion about a second axis (7) in parallel with the first axis, the axes dividing each lever in a shorter lever length (2"; 5") and a longer lever length (2'; 5'),
left and right brake pads (8; 10) respectively, pivotally journaled in the shorter lengths of the left and right levers,
an actuation means (19) engaging the longer lengths of the levers and operable for swinging the levers in contra-rotating directions about their respective axes (4; 7), the actuation means controlling the movements of the brake pads between braking and idle positions as well as generating a clamping force applied by the brake pads in braking,
wherein the actuation means are a screw jack (19) comprising an electric motor (20) and an angle gear (21) driving a jack screw (22) which is coupled between the levers (2; 5),
a load sensor (29) is coupled to the right lever (5) and controls, via a power regulating means (25), the force applied in braking mode,
a position sensor (31) is coupled to the left lever (2) and determines the left lever's positions in idling mode, and said load and position sensors (29, 31) are mounted on opposite ends of said jack screw (22).

20. A braking device (1) comprising:
a left lever (2) journaled in a left bracket (3) for swinging motion about a first axis (4),
a right lever (5) journaled in a right bracket (6) for swinging motion about a second axis (7) in parallel with the first axis, the axes dividing each lever in a shorter lever length (2"; 5") and a longer lever length (2'; 5'),
left and right brake pads (8; 10) respectively, pivotally journaled in the shorter lengths of the left and right levers,
an actuation means (19) engaging the longer lengths of the levers and operable for swinging the levers in contra-rotating directions about their respective axes (4; 7), the actuation means controlling the movements of the brake pads between braking and idle positions as well as generating a clamping force applied by the brake pads in braking,
wherein the actuation means are a screw jack (19) comprising an electric motor (20) and an angle gear (21) driving a jack screw (22) which is coupled between the levers (2; 5),
a load sensor (29) is coupled to the right lever (5) and controls, via a power regulating means (25), the force applied in braking mode,
a position sensor (31) is coupled to the left lever (2) and determines the left lever's positions in idling mode, and
additionally comprising a sensor seat (30) supported on an end region of the longer length (5') of the right lever (5) and in which the load sensor (29) is fixedly received, and
a housing (33) coupled to an outwardly facing side of the longer length (2') of the left lever (2) and in which the position sensor (31) is arranged to detect position of a tip (32) of the jack screw (22) which extends through an opening in the longer length (2') of the left lever (2) and into the housing (33).

* * * * *